United States Patent Office 2,956,044
Patented Oct. 11, 1960

2,956,044
ACRYLOXYMETHYLSILICON POLYMERS

Robert L. Merker, Pittsburgh, Pa., assignor to Dow Corning Corporation, Midland, Mich., a corporation of Michigan No Drawing. Filed Aug. 6, 1956, Ser. No. 602,459

13 Claims. (Cl. 260—46.5)

The present invention relates to polymers prepared from acryloxymethyl and methacryloxymethyl substituted organosilicon compounds and to methods for the preparation of such polymers. This application is a continuation-in-part of my copending application Serial No. 431,295, filed May 20, 1954, now U.S. Patent No. 2,793,223, issued May 21, 1957.

The conventional commercial methods for the curing of organosilicon polymers involve a silanol condensation reaction. In such a reaction, silicon bonded hydroxy groups are condensed during the cure of the material to provide siloxane cross linkages. Since water must be released during the condensation, this method has certain inherent disadvantages. In general, such materials also must be used in solution in a solvent in order to provide reasonably low viscosities for impregnation and dipping operations. The removal of this solvent prior to the final cure of the resin also leads to obviously inherent difficulties. Another major difficulty with hitherto known organosilicon polymers has been the high temperature and relatively long heating schedule necessary to cure them satisfactorily.

Another method which has been proposed for the curing of organosilicon polymers is that of bringing about conventional vinylic type polymerization by means of vinyl groups and the like attached directly to the silicon atom in the monomeric material. Polymers so prepared, however, have had rather poor physical properties. The polymerization of such groups is also quite sluggish, particularly as compared to organic vinylic compounds. Thus any attempted copolymerization with such organic vinylic compounds is carried out only with the greatest of difficulty and with extremely poor yields because the organic compound under such circumstances has such a great preference toward self-polymerization.

It is an object of the present invention to provide organosilicon polymers which can be set at low temperatures and in a short period of time. Another object is to prepare polymers which can be employed in the solventless state as dipping varnishes and impregnating resins. A further object is to prepare copolymers of organosilicon compounds with conventional organic vinylic compounds in a commercially acceptable manner. Other objects and advantages are apparent from the following description.

In accordance with the present invention certain acryloxymethyl substituted organosilicon compounds (this term being used herein as generic to the methacryloxymethyl compounds) are subjected to vinyl polymerizing conditions, either in the absence or presence of organic vinylic type compounds, to produce fluid, resinous, or rubbery polymers or copolymers. The acryloxymethyl substituted organosilicon compounds employed fall within three general types:

(1) Siloxanes consisting of polymeric units of the formula $$(CH_2=CRCOOCH_2)R'_nSiO_{\frac{3-n}{2}}$$

where R is a hydrogen atom or a methyl radical, R' is a monovalent hydrocarbon radical and n is an integer of from 1 to 2 inclusive.

(2) Copolymeric siloxanes in which from 1 to 99 molar percent of the polymeric units are of the type defined under (1) and the remainder of the units are of the formula $$R''_mSiO_{\frac{4-m}{2}}$$

where R'' is a monovalent hydrocarbon, an acetoxymethyl, or a halogenated monovalent hydrocarbon radical and m is an integer of from 0 to 3 inclusive.

(3) Organosilicon compounds of the formula $$CH_2=CRCOOCH_2SiR'_3$$

where R and R' are as above defined.

The above defined acryloxymethyl substituted organosilicon compounds can be prepared by several different methods. The preferred method is that of reacting the corresponding chloromethyl substituted organosilicon compounds with a tertiary amine salt of either acrylic or methacrylic acid. In this method the amine salt need not be prepared and isolated separately, for the reaction proceeds very nicely by merely mixing the tertiary amine, the acid, and the chloromethyl substituted organosilicon compounds. This reaction can be illustrated by the following equation:

$$\equiv SiCH_2Cl + (C_2H_5)_3N + CH_2=CRCOOH \rightarrow$$
$$\equiv SiCH_2OOCCR=CH_2 + (C_2H_5)_3N \cdot HCl$$

In the above equation the open valences of silicon are satisfied by either the defined R' radicals or oxygen atoms which are in turn linked to other silicon atoms. The organic radicals in the tertiary amine are preferably alkyl radicals of from 1 to 4 inclusive carbon atoms, the most preferred amine being triethylamine. This type of reaction is fully illustrated in my copending application Serial No. 567,714, filed February 27, 1956.

Another method for the preparation of the required acryloxymethyl substituted organosilicon compounds is that of reacting a metal salt (preferably an alkali metal salt) of acrylic or methacrylic acid with the corresponding chloromethyl substituted organosilicon compounds. This reaction is preferably conducted in the presence of a mutual solvent such as dimethylformamide and in the presence of a conventional acrylate or methacrylate polymerization inhibitor such as hydroquinone. Alternatively the corresponding chloromethyl substituted organosilicon compound can be reacted with sodium or potassium acetate and the resulting acetoxymethyl substituted compound heated with acrylic or methylacrylic acid at a temperature above the boiling point of acetic acid, whereby an exchange takes place in which the acryloxy or methacryloxy group is substituted on the methyl radical and acetic acid is distilled off. The latter reaction is also preferably carried out in the presence of a polymerization inhibitor.

As is well known in the art, the chloromethyl substituted organosilicon compounds employed as intermediates in the above preparations may themselves be prepared by halogenating the corresponding methyl substituted organosiloxanes, or by halogenating a methyl trihalosilane and subjecting the product to reaction with a Grignard reagent to replace some or all of the silicon bonded halogen atoms, followed if desired by the hydrolysis of an unreacted silicon bonded halogen atoms to produce the corresponding siloxanes.

For the purpose of this invention the R' groups attached to the silicon atom can be any monovalent hydrocarbon radical. Specific examples of such radicals are alkyl radicals such as methyl, ethyl, and octadecyl; alkenyl radicals such as vinyl, allyl, and hexenyl; cycloaliphatic radicals such as cyclohexyl, cyclohexenyl, and cyclopentyl; aromatic radicals such as phenyl, naphthyl, xenyl, and tolyl; and aralkyl radicals such as benzyl. The acryloxymethyl substituted compounds or units can contain either one or two of such monovalent hydrocarbon radicals attached to any given silicon atom, and include reactants which are a mixture of said compounds wherein some of the silicon atoms contain one R' group and others contain two R' groups. The R' groups attached to the individual silicon atoms can be the same or different radicals.

The copolymers of the defined acryloxymethyl substituted organosiloxane units and the

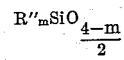

units which can be employed in this invention can be prepared by means of the well known acid catalyzed siloxane copolymerization methods. Any such copolymer employed should contain from 1 to 99 molar percent of the defined acryloxymethyl substituted organosiloxane units. Organosiloxanes of the general formula

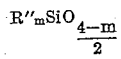

are well known in the art, and many are commercially available materials. In these siloxanes R'' represents any monovalent hydrocarbon, halogenated monovalent hydrocarbon, or acetoxymethyl radical and as previously noted $m$ has a value of from 0 to 3 inclusive. Illustrative examples of suitable R'' radicals are any of the R' radicals illustrated above, and halogenated hydrocarbon radicals such as mono- or dichlorophenyl, bromophenyl, tetrafluoroethyl, $\alpha,\alpha,\alpha$-trifluorotolyl, tetrabromoxenyl; chlorocyclohexyl and chlorovinyl radicals. The organosiloxanes employed to prepare these copolymers can themselves be either homopolymers or copolymers containing the $SiO_2$, $R''SiO_{1.5}$, $R''_2SiO$, or $R''_3SiO_{.5}$ polymeric units in any desired ratio and with any desired variation of R'' radicals attached to silicon atoms, as long as they are liquid or solvent soluble materials so that intimate contact can be made with the acryloxymethylsilicon compounds.

To prepare these copolymers as defined under (2) the acryloxymethyl substituted organosiloxane defined under (1) is merely mixed with the organosiloxane polymer of the formula

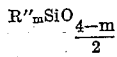

in the desired ratio and the mixture heated in the presence of an acid catalyst such as concentrated sulfuric acid. The acid catalyst is preferably present in an amount of from 0.5 to 3 percent by weight based upon the weight of the combined reactants. This copolymerization proceeds at room temperature, but is preferably speeded up by heating the mixture at a temperature of e.g. from 80° to 160° C.

In the organosilicon polymers and copolymers employed to prepare the polymers of this invention the most preferred compounds are those in which R' and R'' are methyl or phenyl radicals and the most preferred reactants are the disiloxanes having the general formula

where x is an integer of from 0 to 1 inclusive.

The organic vinylic compound which can be employed in the preparation of the copolymers of this invention can be any organic compound containing the

radical, i.e. a vinylic type group in a terminal position in the molecule. The vinyl group or substituted vinyl group can be attached to any other substituents as long as the resulting compound is one which is polymerizable. The polymerizable vinylic compounds are well known in the literature. It is to be understood, however, that the term "polymerizable" as employed herein, and as generally used in the art of organic polymers, does not necessarily mean that the compound must be one which can polymerize with itself. In other words, it includes vinylic compounds which can only copolymerize with other vinylic compounds.

The term "vinylic compound" is employed to stress the fact that it is only the presence of the terminal vinyl type radical which is controlling here. When the vinyl radical is attached to a benzene ring the reactant is of course styrene, when it is attached to a cyanide radical the reactant would be acrylonitrile. It can also be attached to carbon atoms which are themselves attached to other substituents as in the methacrylates or allyl derivatives such as diallylphthalate, triallylcyanurate, and the like, or the vinylic radical may be attached to a mere hydrocarbon chain of some sort as in isoprene. Thus it can be seen that the term "vinylic" is used herein even though the vinyl group forms a mere portion of a larger radical in a manner such that the entire compound itself would or could be given a name which does not employ the prefix "vinyl."

The most preferred vinylic compounds which can be employed in the preparation of the copolymers of this invention fall within 5 general types. In order to avoid confusion with the 3 types of acryloxymethyl substituted organosilicon reactants described above, the preferred vinylic compounds are described as items (4) to (8) below. These vinylic compounds can be defined as follows:

(4) Compounds of the formula $CH_2=CHX$ where X is chlorine or one of the radicals $-C_6H_5$, $-C_6H_4CH=CH_2$, $-C_6H_3Cl_2$, $-CN$, $-OOCCH_3$,

carbazolyl, $-COOR^3$, and $-OR^3$ where $R^3$ is a lower alkyl radical e.g. of 1 to 8 inclusive carbon atoms. Thus the defined formula represents the compounds vinyl chloride, styrene, divinylbenzene, dichlorostyrene, acrylonitrile, vinyl acetate, vinylpyridine, vinylcarbazole, alkylacrylates, and vinylalkyl ethers respectively. Preferably the $R^3$ radicals are methyl or ethyl radicals.

(5) Compounds of the formula $CH_2=CYZ$ where Y and Z are either Cl or $CH_3$ radicals. This formula represents the compounds vinylidene chloride, isobutylene and isopropenyl chloride.

(6) The lower alkyl methacrylates, particularly the methyl and ethyl methacrylates.

(7) Compounds of the formula $CH_2=CQCH=CH_2$ where Q represents H or Cl atoms or the $CH_3$ radical. This formula represents the compounds butadiene, chloroprene, and isoprene.

(8) Linear unsaturated polyesters of ethylene glycol and either maleic, fumaric, or itaconic acids.

Of all the various organic vinylic reactants which can be employed in preparing the copolymers which are part of this invention, the most preferred compounds are methyl methacrylate, acrylonitrile, styrene, methyl acrylate, and vinyl acetate. Whenever any of the organic vinylic reactants are incorporated in the polymers of this invention, there should be at least 1 molar percent of the acryloxymethyl substituted organosilicon units present. In other words, the reactants (1), (2), and (3) should be present in an amount of from 1 to 100 molar percent inclusive in the total reaction mixture. In order for any organic vinylic groups present to have an observable effect upon the copolymer, there is preferably at least 1 molar percent of these units present. Thus the preferred copolymers contain from 1 to 99 inclusive molar percent of units derived from (1), (2), and/or (3), and from 99 to 1 inclusive molar percent of units derived from reactants (4) through (8).

When the reactants are themselves polymers or copolymers, the term "molar percent" is not used herein as based upon the actual molecular weight of the polymer or copolymer per se, but rather as based upon the molecular weight of the unit or average molecular weight of the units which are present in such reactants, as is the common practice in the polymer act. When a copolymer of type (2) is one reactant and an organic vinylic material is the other, it is preferred that there be from 1 to 99 vinylic groups present which are derived from (2) for every 100 total vinylic groups present in the total reaction mass.

In order to prepare the polymers or copolymers of this invention, the acryloxymethyl substituted organosilicon compounds, either alone or in an intimate mixture with one or more of the defined organic vinylic compounds, are exposed to vinyl polymerizing conditions. It is to be understood that when the organosilicon reactant is polymerized "alone," i.e. in the absence of any organic vinylic compound, it can be either as a homopolymer or a copolymer. In other words, any mixture of different reactants falling within the scope of any one of the definitions in (1), (2), or (3) above, or any mixture containing reactants from more than one of the types (1), (2), and (3), can be employed to produce copolymers. For example, the compounds

and

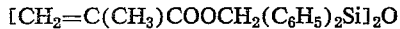

both of which are type (1) compounds, can be mixed and copolymerized in accordance with this invention, or either of these (or both) can be mixed and copolymerized with one or more type (2) and/or (3) compounds.

The "vinyl polymerizing conditions" employed herein can be any of the usual conditions which are well known in the art of polymerizing the organic vinylic compounds. Thus conventional bulk polymerization, solvent solution or suspension polymerization, and emulsion polymerization techniques are all applicable. Any of the conventional catalysts (organic, inorganic, or physical such as ultra violet light and ionizing radiation) commonly used to catalyze the polymerization of vinylic type organic polymerizable monomers are also applicable.

Examples of conventional physical catalysis which may be used are the use of photopolymerization with light having a wave length of 1800 to 7000 A. (alone or in the presence of vicinal polycarboxyl compounds such as biacetyl 2,3-pentanedione and benzyl or phenyl glyoxal), and ionizing radiation with beta rays, gamma rays, X-rays, and accelerated electrons, protons, neutrons, deuterons, and alpha particles from sources such as nuclear reactors, radioactive isotopes, betatrons, cyclotrons, resonant transformers, and linear accelerators. A "Van de Graaff generator" is a convenient and practical source of such radiation. Heat alone, or with high pressures in some systems (e.g. those containing isoprene), can also bring about polymerization.

Preferably an organic or inorganic catalyst is employed. As examples may be named the peroxygen compounds such as hydrogen peroxide, sodium peroxide, benzoyl peroxide, diacetyl peroxide, lauryl peroxide, 3,4-dichlorobenzoyl peroxide, acetyl benzoyl peroxide, and t-butyl hydroperoxide; organic "per" compounds such as acetic peracid, monopersuccinic acid, perpropionic acid, di(t-butylperphthalate), di-(t-butyl peradipate), t-butyl perbenzoate, etc.; dihydrocarbon peroxides such as diethyl peroxide, di(t-butyl) peroxide, and the like; compounds such as ammonium persulfate and potassium permanganate; and ozone. The preferred peroxygen compounds are those which are capable of supplying free radicals. Other "free radical generators" are also suitable, as for example the azo compounds, particularly those containing tertiary carbon atoms (i.e. carbon atoms having no hydrogen attached thereto) attached to each nitrogen atom of the azo linkage. The remaining valences of the tertiary carbon are satisfied by nitrile radicals, carboxyalkyl radicals, cycloalkylene radicals, alkyl radicals, and radicals of the formula YOOC— where Y is an alkyl radical. Specific examples of such azo compounds are $$Me_2(NC)CN=NC(CN)Me_2$$
$$MeEt(NC)CN=NC(CN)MeEt$$
$$Et_2(NC)CN=NC(CN)Et_2$$
$$Pr_2(NC)CN=NC(CN)Pr_2$$
$$AmMe(NC)CN=NC(CN)MeAm$$
$$(HOOCCH_2CH_2)Me(NC)CN$$
$$=NC(CN)Me(CH_2CH_2COOH)$$
$$(MeOOC)Me_2CN=NCMe_2(COOMe)$$
$$(EtOOC)Me_2CN=NCMe_2(COOEt)$$

and

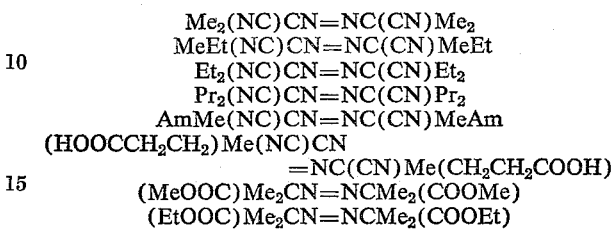

The symbols Me, Et, Pr, Am, and Ph have been used above and throughout this specification to represent methyl, ethyl, propyl, amyl, and phenyl respectively.

The compounds α,α'-azodi-iso-butyronitrile and benzoyl peroxide are preferred as catalysts. Friedel-Crafts catalysts such as $AlCl_3$ and $BF_3$ can also be used herein, but are not particularly preferred.

A mere trace of catalyst is often sufficient to bring about polymerization, but excess amounts usually do no particular harm. The minimum satisfactory amount will of course vary with the type of catalyst and reactants and the amount of inhibiting impurities which may be present. Ordinarily from 0.01 to 3.0 percent by weight of the catalyst based on the weight of the reactants can be employed.

As noted previously, the typical polymerization techniques used with organic vinylic polymerizations can be used in practicing this invention. Emulsion polymerization in an aqueous solution of a water soluble acid such as acetic acid, with hydrogen peroxide and ferric ions present as catalysts (as used in the polymerization of methyl methacrylate) as an example. Typical emulsifying agents such as sodium stearate, sodium salts of acid sulfuric esters of high molecular weight alcohols, sulfonates, colloids such as gelatin and albumin, and cocoanut oil soap are also applicable in the emulsion polymerizations.

The effect of various additives in this invention is comparable to the effect obtained in similar all-organic systems. Thus tannic acid can be used as an inhibitor to control the rate or degree of polymerization in the same manner as it is used in methyl methacrylate polymerizations. Chlorobenzene or carbon tetrachloride can be used as reaction activators or promoters in systems containing, e.g. acrylonitrile. Somewhat the opposite effect is obtained from carbon tetrachloride in systems containing, e.g. butadiene, where it helps to prevent excessive chain branching.

A wide range of temperatures are suitable for these polymerization reactions, varying from room temperature or below to extremely high temperatures such as the 150° to 400° C. at 200 atmospheres pressure which has been suggested for methyl methacrylate polymerizations where dimethyl aniline is the catalyst. Ordinarily the lower temperatures require a longer period to provide a particular degree of polymerization, but obviously the optimum temperature will vary with the reactants, catalyst, and polymerization technique (bulk, emulsion, etc.) being used as well as with the degree of polymerization which is sought. Bulk polymerizations with peroxide catalysts are usually carried out at 40° to 130° C., solvent solution or suspension polymerizations are usually carried out at any temperature up to the reflux temperature of the solvent, and emulsion polymerizations are generally conducted at 50° to 80° C. for as much as 6 days when monomers such as butadiene are present or for only a few hours when monomers such as styrene or methyl methacrylate are present.

When an organic peroxide is being used as the catalyst, it is preferable to conduct the polymerization in the substantial absence of atmospheric oxygen. An inert atmosphere, e.g. of nitrogen, is highly desirable for this purpose.

The polymers and copolymers of this invention can be fluid, resinous, or rubbery in nature. In general the fluid materials are those which have been prepared with little or no organic vinylic reactants present and with comparatively few acryloxymethyl substituted silicon atoms present in the original reactants, together with an average ratio of R' plus R'' radicals to Si atoms of at least 2:1. Those polymers and copolymers prepared only from the organosilicon reactants are closely akin to the conventional organosiloxane polymers in their physical properties, and hence are useful in all of the many and widely known uses of such organosiloxanes, e.g. as molding and impregnating resins, electrical, insulating varnishes, water repellent treatments, lubricating fluids, and thermally resistant rubbers and resins.

The copolymers containing the organic vinylic substituents of course partake of many of the properties of those substituents, and are generally of a resinous or rubbery nature. Depending upon the amount of type of organic substituents present, the copolymers find utility as coating agents, impregnating and molding resins, adhesives, bonding agents, etc. Many desirable properties are brought about or improved by incorporating the organic substituents in a polymer whose major substituents are organosilicon, as well as when the organosilicon substituents are incorporated into a polymer which is mainly organic. For example, a small amount of the acryloxymethylsilicon units in organic polymers improves the thermal stability and water repellency thereof and in vinyl- or vinylidene chloride polymers makes the latter more stable to discoloration. In other organic polymers the organosilicon units act as "internal plasticizers" or modify the tackiness of adhesives. Conversely, a small amount of organic polymers such as methyl methacrylate incorporated into the acryloxymethylsilion polymers improves the hardness thereof. Changes in the solubility of polymers in particular solvents, or desirable changes in the solvent resistance of particular polymers to particular solvents, can also be brought about.

One of the most startling effects upon physical properties brought about by incorporating organosilicon units into organic polymers in the particular manner of this invention is the effect upon the coefficient of friction. For example, in the particular testing device used, a sheet of a homopolymer of methyl methacrylate showed a coefficient of friction of 0.11 whereas a comparable sheet of a copolymer of this material with 30 percent methacryloxymethylpentamethyldisiloxane had a value of only 0.03, or only about one-fourth that of the pure polymer. The extremely low nature of the latter figure is apparent when one considers the fact that "Teflon" (polytetrafluoroethylene) and oiled sapphire showed values of 0.05 and 0.13 respectively when tested on the same device. Since the coefficient of friction of the copolymer is the lowest yet observed for solid materials in the absence of oil lubrication, the use of the copolymer for watch bearings and the like is suggested. The low coefficient of friction brought about by incorporating the acryloxymethylsilicon units in accordance with this invention brings about an improved abrasion or scratch resistance in sheets, rods, and tubes of cast or extruded polymers. It also brings about improved abrasion resistance in those polymers capable of being drawn into filaments (e.g. in acrylonitrile polymers such as "Orlon"), thus improving the durability and "wear resistance" of textiles manufactured from such polymers.

Studies of the reactivity ratios of the copolymerization of acryloxymethyl substituted organosilicon reactants with various types of organic vinylic monomers such as methyl methacrylate, acrylonitrile, vinyl acetate, styrene, and methyl acrylate indicate that the reactivity of the organosilicon materials is practically comparable to that of methyl acrylate or methyl methacrylate in the same copolymer systems. Thus the copolymerizations lead to high yields of true copolymers with very little by-production of the organic homopolymers.

The following examples are illustrative only.

EXAMPLE 1

A mixture of 50.5 g. of potassium methacrylate, 46.5 g. of bis-chloromethyltetramethyldisiloxane, 75 g. of methacrylic acid and 75 g. of dimethylformamide was refluxed for 1 hour. The product was filtered and the solvent removed. Upon distillation the product bis-methacryloxymethyltetramethyldisiloxane, a fluid material having the formula $$\left[\begin{array}{cc} Me & Me_2 \\ CH_2=CCOOCH_2Si \end{array}\right]_2 O$$

was obtained. This fluid had the following properties: B.P. 127° C. at 3 mm., $n_D^{25}$ 1.4472, $d_4^{25}$ 0.996, MR found 88.52, theory 88.46. One mol of the above methacryloxymethyl substituted disiloxane was copolymerized with 3 mols of hexamethyldisiloxane by mixing the two with 2 g. of concentrated sulfuric acid and 5 g. of trifluoroacetic acid. The mixture was allowed to stand for 12 hours and was then washed with sodium bicarbonate until neutral. The product was dried and distilled to give the compound methacryloxymethylpentamethyldisiloxane

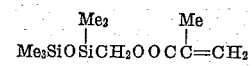

which had the following properties: B.P. 86.5° C. at 10 mm., $n_D^{25}$ 1.4202, $d_4^{25}$ 0.903, MR found 68.9, theory 68.7, bromine No. found 64.6, theory 64.7. Benzoyl peroxide in an amount of .01 percent by weight was added to this product and the mixture heated at 70° C. under nitrogen for two hours. The resulting polymer was a resilient plastic material.

EXAMPLE 2

A mixture of 48 g. of bis-acetoxymethyltetramethyldisiloxane, 50 g. of hexamethyldisiloxane, 43 g. acrylic acid, 2 g. concentrated sulfuric acid and 5 g. hydroquinone was refluxed under nitrogen for 8 hours. The product was washed free of acid and distilled to give one fraction which was the compound acryloxymethylpentamethyldisiloxane, i.e.

$$Me_3SiOSi(Me)_2CH_2OOCCH=CH_2$$

boiling at 88.7° C. at 10 mm. Hg pressure, $n_D^{25}$ 1.4165, $d_4^{25}$ 0.906. One mol of this disiloxane and 2 mols of octamethylcyclotetrasiloxane were mixed with 5 percent by weight of concentrated sulfuric acid and allowed to stand at room temperature for 12 hours. The product was washed free of acid and there was obtained a liquid material which had the average general formula $$Me_3SiO(Me_2SiO)_ySi(Me)_2CH_2OOCCH=CH_2$$

This fluid polymerized to a resilient material when heated with 0.1 percent by weight benzoyl peroxide at 70° C. in a nitrogen atmosphere. The second fraction of the original distillate was the compound acetoxymethylacryloxymethyltetramethyldisiloxane, i.e.

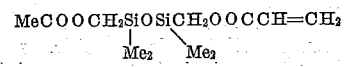

boiling at 137.8° C. at 10 mm., $n_D^{25}$ 1.4337, $d_4^{25}$ 1.01.

The distillation residue was the compound bis-acryloxymethyltetramethyldisiloxane

$n_D^{25}$ 1.4480. Each of the latter compounds polymerizes to resinous materials when heated with benzoyl peroxide as above, or the two can be heated together to form a resinous copolymer containing units derived from both.

EXAMPLE 3

10 g. of bis-methacryloxymethyltetramethyldisiloxane as prepared in Example 1 and 10 g. of phenylmethylpolysiloxane were copolymerized with 2 g. of concentrated sulfuric acid in the manner of Example 2. The resulting copolymer had the average general formula

This copolymer was polymerized to a hard tough resin when heated at 120° C. under nitrogen with 0.1 percent by weight azo-iso-butyronitrile.

EXAMPLE 4

When chloromethylheptamethylcyclotetrasiloxane is reacted with acrylic acid and triethylamine, the compound

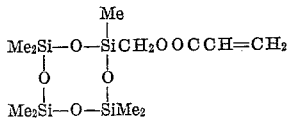

is obtained. When 1 mol of this compound is copolymerized with 0.5 mol of vinylmethylsiloxane and 0.5 mol of chlorophenylmethylsiloxane in the presence of concentrated sulfuric acid, a viscous copolymer containing 25 mol percent vinylmethylsiloxane, 25 mol percent chlorophenylmethylsiloxane, 37.5 mol percent dimethylsiloxane, and 12.5 mol percent acryloxymethylmethylsiloxane units is obtained. Mixing this copolymer with 20 percent by weight of silica aerogel as a filler and 1 percent by weight of benzoyl peroxide, followed by heating the mixture at 100° C., provides a tough organosilicon rubber.

EXAMPLE 5

When (ClCH₂MePhSi)₂O is reacted with methacrylic acid and triethylamine, the product

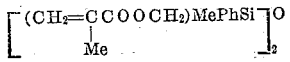

is obtained. When this product is copolymerized with phenylethylsiloxane in the presence of sulfuric acid, a copolymer of the formula

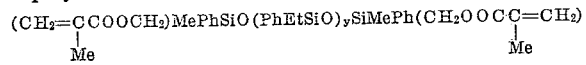

is obtained. When equal amounts of the latter and methyl acrylate are mixed and heated at 70° C. in the presence of 0.1 percent by weight of benzoyl peroxide, a hard resinous copolymer is obtained.

EXAMPLE 6

Mixtures were prepared containing 20, 40, 60, and 80 weight percent respectively of methacryloxymethylpentamethyldisiloxane prepared as in Example 1, the remainder of each mixture being methyl methacrylate. For simplicity the latter is designated "MMA" and the former "SiMA" hereinafter. Equal amounts of each mixture and of 100 percent MMA for comparative purposes were mixed with 0.1 percent by weight of α,α'-azodi-iso-butyronitrile and heated at 70° C. for 16 hours under a nitrogen atmosphere. Solid copolymeric resins were obtained in each case. The Rockwell hardness (R scale) and density ($d_4^{25}$) of each polymer is shown in Table I below. Portions of the 60 percent SiMA and 100 percent MMA polymers were dissolved in acetone and films were deposited on glass from the solution. The contact angles for water droplets on these films were 91° and 58° respectively, showing the water repellent characteristics of the former. The contact angle for water on a comparable film of 100 percent SiMA polymerized in the same manner was 101°.

Table I

| Wt. Percent (SiMA) | Mol Percent (MMA) | Molar Ratio, MMA/SiMA | Rockwell Hardness (R) | Density |
|---|---|---|---|---|
| 0 | 100 | --- | 121 | 1.185 |
| 20 | 90.8 | 9.86 | 120 | 1.152 |
| 40 | 78.7 | 3.70 | 113 | 1.112 |
| 60 | 62.1 | 1.64 | 91 | 1.075 |
| 80 | 38.1 | 0.62 | 28 | 1.040 |

EXAMPLE 7

In order to study the reactivity ratios in various copolymeric systems, two component mixtures of the "SiMA" of Example 6 and acrylonitrile, vinyl acetate, styrene, and methyl acrylate respectively were prepared in molar proportions of the organic monomer to "SiMA" of 9/1, 8/2, 6/4, and 4/6 for each series. An amount of 0.15 mol of total monomers (i.e. organic plus "SiMA") from each mixture was placed in a glass tube, 0.00015 mol of α,α'-azodi-iso-butyronitrile was added to each, and the mixtures were frozen while air was exhausted from the tubes. The tubes were then sealed and heated at 50° C. for 3½ hours. The time and temperature were deliberately kept low to insure no more than 20 percent conversion of monomers because the major point of the experiment was in regard to reactivity ratios. The tubes were then opened, the contents of each diluted with 25 ml. of benzene, and 200 ml. of methanol added to each to precipitate the copolymer. It was found that copolymers had formed in each instance. In general, in each series of copolymers an increase in the "SiMA" content had brought about a decrease in the hardness of the copolymer. All of the copolymers were nearly transparent, and each contained an increasing amount of silicon with increasing proportions of "SiMA" in the original mixture.

EXAMPLE 8

Mixtures were prepared containing weight ratios of 70/30 and 50/50 respectively of the "MMA" and "SiMA" of Example 6. These were polymerized at 70° C. for 16 hours under a nitrogen atmosphere with 0.1 percent by weight of α,α'-azodi-iso-butyronitrile present as the catalyst, and hard clear resins were produced. The resin containing 30 percent of "SiMA" was found to have a coefficient of friction of 0.03, that which contained 50 percent had a value of 0.07. As a comparison, a comparable polymer of polymethylmethacrylate was found to have a coefficient of friction of 0.11.

EXAMPLE 9

The compound Me₂PhSiCH₂OOCC(Me)=CH₂ was prepared by reacting the corresponding chloromethyl substituted derivative with methacrylic acid and triethylamine. When this compound is subjected to emulsion polymerization with butadiene, using the typical butadiene emulsion polymerization technique and employing 75 parts butadiene, 25 parts of the organosilicon compound, 3 parts of a sodium alkyl sulfate as emulsifying agent, 3 parts sodium acetate as a buffer, 0.5 part sodium perborate as catalyst, and 300 parts water (all parts being parts by weight), and heating the emulsion under 6 atmospheres pressure for 4 hours at 60° C., a copolymeric latex is obtained. A similar process in which vinyl chloride or mixtures of vinyl chloride and vinylidene chloride replace the butadiene in the above formulation, followed by distilling out the unreacted monomers and spray drying the emulsion, results in a powdered or granular thermoplastic copolymer.

EXAMPLE 10

When mixtures of any of the linear unsaturated polyesters of ethylene glycol or polyethylene glycol and maleic acid, e.g. those falling within the general formula

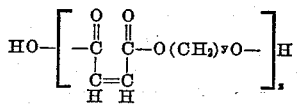

and bis-(acryloxymethyl) tetramethyldisiloxane or methacryloxymethylpentamethyldisiloxane are heated for 24 hours at 50° C. with 0.1 percent by weight of benzoyl peroxide present as the catalyst, hard thermosetting copolymeric resins are obtained.

That which is claimed is:

1. A process for the preparation of modified acrylic resins which comprises polymerizing in a liquid phase and by an addition polymerization mechanism, a compound selected from the group consisting of (1) siloxanes consisting of polymeric units of the formula $$(CH_2=CRCOOCH_2)R'_nSiO_{\frac{3-n}{2}}$$

where R is selected from the group consisting of hydrogen and methyl radicals, R' is a monovalent hydrocarbon radical and $n$ is an integer of from 1 to 2 inclusive and (2) copolymeric siloxanes in which from 1 to 99 molar percent of the polymeric units are of the formula defined in (1) and the remainder of the units are of the formula $$R''_mSiO_{\frac{4-m}{2}}$$

where R'' is a radical selected from the group consisting of acetoxymethyl, monovalent hydrocarbon, and halogenated monovalent hydrocarbon radicals and $m$ is an integer of from 0 to 3 inclusive by subjecting said compound in liquid phase to conditions of polymerization capable of generating free radicals.

2. A process for the preparation of modified acrylic resins which comprises polymerizing in a liquid phase and by an addition polymerization mechanism an intimate mixture of (A) from 1 to 99 molar percent of an organosilicon compound selected from the group consisting of (1) siloxanes consisting of polymeric units of the formula $$(CH_2=CRCOOCH_2)R'_nSiO_{\frac{3-n}{2}}$$

where R is selected from the group consisting of hydrogen and methyl radicals, R' is a monovalent hydrocarbon radical and $n$ is an integer of from 1 to 2 inclusive and (2) copolymeric siloxanes in which from 1 to 99 molar percent of the polymeric units are of the formula defined in (1) and the remainder of the units are of the formula $$R''_mSiO_{\frac{4-m}{2}}$$

where R'' is a radical selected from the group consisting of acetoxymethyl, monovalent hydrocarbon, and halogenated monovalent hydrocarbon radicals and $m$ is an integer of from 0 to 3 inclusive, and (B) from 99 to 1 molar percent of a polymerizable vinylic compound selected from the group consisting of (3) compounds of the formula $CH_2=CHX$ where X is selected from the group consisting of Cl atoms and $-C_6H_5$, $-C_6H_4CH=CH_2$, $-C_6H_3Cl_2$, $-CN$, $-OOCCH_3$,

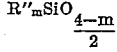

carbazolyl, $-COOR^3$, and $-OR^3$ radicals where $R^3$ is a lower alkyl radical, (4) compounds of the formula $CH_2=CYZ$ where Y and Z are selected from the group consisting of Cl and $CH_3$ radicals, (5) lower alkyl methacrylates, (6) compounds of the formula $$CH_2=CQCH=CH_2$$

where Q is selected from the group consisting of H, Cl, and $CH_3$ radicals, and (7) linear unsaturated polyesters of ethylene glycol and an acid selected from the group consisting of maleic, fumaric, and itaconic acids, by subjecting said mixture in liquid phase to conditions of polymerization capable of generating free radicals.

3. A modified acrylic resin consisting essentially of an addition copolymer of (A) from 1 to 99 molar percent of an organosilicon compound selected from the group consisting of (1) siloxanes consisting of polymeric units of the formula $$(CH_2=CRCOOCH_2)R'_nSiO_{\frac{3-n}{2}}$$

where R is selected from the group consisting of hydrogen and methyl radicals, R' is a monovalent hydrocarbon radical and $n$ is an integer of from 1 to 2 inclusive and (2) copolymeric siloxanes in which from 1 to 99 molar percent of the polymeric units are of the formula defined in (1) and the remainder of the units are of the formula $$R''_mSiO_{\frac{4-m}{2}}$$

where R'' is a radical selected from the group consisting of acetoxymethyl, monovalent hydrocarbon, and halogenated monovalent hydrocarbon radicals and $m$ is an integer of from 0 to 3 inclusive, with (B) from 99 to 1 molar percent of a polymerizable vinylic compound selected from the group consisting of (3) compounds of the formula $CH_2=CHX$ where X is selected from the group consisting of Cl atoms and $-C_6H_5$, $-C_6H_4CH=CH_2$, $-C_6H_3Cl_2$, $-CN$, $-OOCCH_3$,

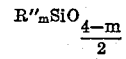

carbazolyl, $-COOR^3$, and $-OR^3$ radicals where $R^3$ is a lower alkyl radical, (4) compounds of the formula $CH_2=CYZ$ where Y and Z are selected from the group consisting of Cl and $CH_3$ radicals, (5) lower alkyl methacrylates, (6) compounds of the formula $$CH_2=CQCH=CH_2$$

where Q is selected from the group consisting of H, Cl, and $CH_3$ radicals, and (7) linear unsaturated polyesters of ethylene glycol and an acid selected from the group consisting of maleic, fumaric, and itaconic acids.

4. A modified acrylic resin consisting essentially of an addition copolymer of a siloxane having the general formula $$(CH)_{3-x}(CH_2=CRCOOCH_2-)_x$$
$$SiOSi(CH_3)_2CH_2OOCRC=CH_2$$

where R is selected from the group consisting of hydrogen and methyl radicals and $x$ is an integer of from 0 to 1 inclusive, with styrene.

5. A modified acrylic resin consisting essentially of an addition copolymer of a siloxane having the general formula $$(CH)_{3-x}(CH_2=CRCOOCH_2-)_x$$
$$SiOSi(CH_3)_2CH_2OOCRC=CH_2$$

where R is selected from the group consisting of hydrogen and methyl radicals and $x$ is an integer of from 0 to 1 inclusive, with acrylonitrile.

6. A modified acrylic resin consisting essentially of an addition copolymer of a siloxane having the general formula $$(CH_3)_{3-x}(CH_2=CRCOOCH_2-)_x$$
$$SiOSi(CH_3)_2CH_2OOCRC=CH_2$$

where R is selected from the group consisting of hydrogen and methyl radicals and $x$ is an integer of from 0 to 1 inclusive, with vinyl acetate.

7. A modified acrylic resin consisting essentially of an addition copolymer of a siloxane having the general formula $$(CH_3)_{3-x}(CH_2=CRCOOCH_2-)_x SiOSi(CH_3)_2CH_2OOCRC=CH_2$$

where R is selected from the group consisting of hydrogen and methyl radicals and $x$ is an integer of from 0 to 1 inclusive, with methyl acrylate.

8. A modified acrylic resin consisting essentially of an addition copolymer of methacryloxymethylpentamethyldisiloxane with methyl methacrylate.

9. A resin as in claim 8 wherein the methacryloxymethylpentamethyldisiloxane constitutes from 10 to 50 percent by weight of the total methacryloxymethylpentamethyldisiloxane plus methyl methacrylate.

10. A resinous composition in which the resinous constituent consists essentially of an addition copolymer of (1) a siloxane having the formula $$(CH_3)_{3-x}(CH_2=CRCOOCH_2-)_x SiOSi(CH_3)_2CH_2OOCRC=CH_2$$

where R is selected from the group consisting of hydrogen and methyl radicals and $x$ is an integer of from 0 to 1 inclusive, and (2) methyl methacrylate.

11. A resinous composition in which the resinous constituent consists essentially of an addition copolymer of (1) an organosiloxane containing at least 1 molar percent of units having the formula $$(CH_2=CRCOOCH_2)R'_nSiO_{\frac{3-n}{2}}$$

where R is selected from the group consisting of hydrogen and methyl radicals, R' is a monovalent hydrocarbon radical and $n$ is an integer of from 1 to 2 inclusive, any other units present being of the formula $$R''_mSiO_{\frac{4-m}{2}}$$

where R" is a radical selected from the group consisting of acetoxymethyl, monovalent hydrocarbon, and halogenated monovalent hydrocarbon radicals and $m$ is an integer of from 0 to 3 inclusive, and (2) methyl methacrylate.

12. A modified acrylic resin consisting essentially of an addition copolymer of (A) from 1 to 99 molar percent of an organosilicon compound of the formula $CH_2=CRCOOCH_2SiR'_3$ where R is selected from the group consisting of hydrogen and the methyl radical and R' is a monovalent hydrocarbon radical, and (B) from 99 to 1 molar percent of a polymerizable vinylic compound selected from the group consisting of (1) compounds of the formula $CH_2=CHX$ where X is selected from the group consisting of Cl atoms and $-C_6H_5$, $-C_6H_4CH=CH_2$, $-C_6H_3Cl_2$, $-CN$, $-OOCCH_3$

carbazolyl, $-COOR^3$, and $-OR^3$ radicals where $R^3$ is a lower alkyl radical, (2) compounds of the formula $CH_2=CYZ$ where Y and Z are selected from the group consisting of Cl and $CH_3$ radicals, (3) lower alkyl methacrylates, (4) compounds of the formula $CH_2=CQCH=CH_2$ where Q is selected from the group consisting of H, Cl, and $CH_3$ radicals, and (5) linear unsaturated polyesters of ethylene glycol and an acid selected from the group consisting of maleic, fumaric, and itaconic acids.

13. A process for the preparation of modified acrylic resins which comprises making an intimate mixture of (A) from 1 to 99 molar percent of an organosilicon compound selected from the group consisting of (1) siloxanes consisting of polymeric units of the formula $$(CH_2=CRCOOCH_2)R'_nSiO_{\frac{3-n}{2}}$$

where R is selected from the group consisting of hydrogen and methyl radicals, R' is a monovalent hydrocarbon radical and $n$ is an integer of from 1 to 2 inclusive, and (2) copolymeric siloxanes in which from 1 to 99 molar percent of the polymeric units are of the formula defined in (1) and the remainder of the units are of the formula $$R''_mSiO_{\frac{4-m}{2}}$$

where R" is a radical selected from the group consisting of acetoxymethyl, monovalent hydrocarbon, and halogenated monovalent hydrocarbon radicals and $m$ is an integer of from 0 to 3 inclusive, (B) from 99 to 1 molar percent of a polymerizable vinylic compound selected from the group consisting of (3) compounds of the formula $CH_2=CHX$ where X is selected from the group consisting of Cl atoms and $-C_6H_5$, $-C_6H_4CH=CH_2$, $-C_6H_3Cl_2$, $-CN$, $-OOCCH_3$

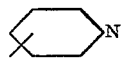

carbazolyl, $-COOR^3$, and $-OR^3$ radicals where $R^3$ is a lower alkyl radical, (4) compounds of the formula $CH_2=CYZ$ where Y and Z are selected from the group consisting of Cl and $CH_3$ radicals, (5) lower alkyl methacrylates, (6) compounds of the formula $CH_2=CQCH=CH_2$ where Q is selected from the group consisting of H, Cl, and $CH_3$ radicals, and (7) linear unsaturated polyesters of ethylene glycol and an acid selected from the group consisting of maleic, fumaric, and itaconic acids, and (C) a vinyl polymerization catalyst selected from the group consisting of free radical-supplying organic peroxides and free radical-supplying organic azo compounds, and heating the mixture at a temperature of from 40° to 130° C.

References Cited in the file of this patent

UNITED STATES PATENTS

| | | |
|---|---|---|
| 2,692,887 | Berry | Oct. 26, 1954 |
| 2,793,223 | Merker | May 26, 1954 |